United States Patent [19]

Taga

[11] Patent Number: 4,680,118
[45] Date of Patent: Jul. 14, 1987

[54] PLEATED AND SEALED FILTER CARTRIDGE WITH CONNECTED FILM

[75] Inventor: Jun Taga, Kawasaki, Japan

[73] Assignee: Mitsui & Co., Ltd., Tokyo, Japan; a part interest

[21] Appl. No.: 789,572

[22] Filed: Oct. 21, 1985

[30] Foreign Application Priority Data

Oct. 19, 1984 [JP] Japan ................. 59-21834

[51] Int. Cl.⁴ ............................................. B01D 27/06
[52] U.S. Cl. ................. 210/493.1; 210/493.2; 55/498; 55/499; 55/502; 55/521
[58] Field of Search .............. 210/493.1, 493.2, 445; 55/498, 500, 521, 497, 502, 503, 511, 501

[56] References Cited

U.S. PATENT DOCUMENTS

| | | | |
|---|---|---|---|
| 3,457,339 | 7/1969 | Pall et al. | 264/162 |
| 3,815,754 | 6/1974 | Rosenberg | 210/445 |
| 3,834,134 | 9/1974 | McAllister | 55/511 |
| 3,867,294 | 2/1975 | Pall et al. | 210/493.2 |
| 3,979,295 | 9/1976 | Markley | 210/445 |
| 4,033,881 | 7/1977 | Pall | 210/493.2 |
| 4,104,170 | 8/1978 | Nedza | 210/493.2 |
| 4,133,661 | 1/1979 | Strnad | 55/503 |
| 4,154,688 | 5/1979 | Pall | 210/493.1 |
| 4,172,797 | 10/1979 | Robichaud et al. | 210/493.1 |
| 4,386,948 | 6/1983 | Choksi et al. | 210/445 |
| 4,402,830 | 9/1983 | Pall | 210/493.2 |
| 4,479,874 | 10/1984 | Rosenberg et al. | 210/445 |
| 4,512,892 | 4/1985 | Ganzi et al. | 210/493.2 |
| 4,522,719 | 6/1985 | Kuwajima et al. | 210/493.1 |
| 4,536,291 | 8/1985 | Hoffman et al. | 210/493.1 |

FOREIGN PATENT DOCUMENTS 118761 11/1974 Japan .
18991 6/1976 Japan .

*Primary Examiner*—Richard V. Fisher
*Assistant Examiner*—Wanda L. Millard
*Attorney, Agent, or Firm*—Holman & Stern

[57] ABSTRACT

A cartridge filter comprises a pleat-type porous membrane having a longer length than an effective filtering surface thereof; upper and lower end plates; a plurality of segmented cylindrical core members disposed between the upper and lower end plates; and protective caps for fastening and sealing an upper and lower reminder of the pleat-type porous membrane other than the effective filtering surface thereof. Each of said end plates is provided with a plurality of fins, each of which is covered by the pleat-type porous membrane. The pleat-type porous membrane is folded at each corner of respective end plates and fastened firmly between the end plate and the protective cap by melting means, adhesion or sealing means.

4 Claims, 4 Drawing Figures

PLEATED AND SEALED FILTER CARTRIDGE
WITH CONNECTED FILM

BACKGROUND OF THE INVENTION (1) Field of the Invention

This invention relates to a pleat type cartridge filter.

(2) Description of the Prior Art

Various ultramicro-porous membrane filters in which each pore is no more than 5 μ are used for microfiltration or ultrafiltration of air, gas, liquid, etc. Today, the demand for such ultramicro-porous membrane filters is increased more and more due to rapid progress of electronics, biotechnology and other scientific field.

There are known various kinds of cartridge filters using the membrane made of cellulose, polyamide, polyester, polypropylene, polyethylene, nonwoven material of glass fiber, paper or the like.

This invention provides further improvements of such conventional cartridge filters as well as a novel cartridge filter whose all components are made of polytetrafluoroethylene (hereinafter called "TFE"). Because TFE has excellent physical and chemical properties, it has been expected to produce all TFE-made cartridge filter, but so far it has been considered to be impossible to produce such a cartridge filter.

An average diameter of a conventional cartridge filter is about 75 mm. This invention enables production of a large-size cartridge filter having more than 500 mm in diameter.

Before describing preferred examples of my invention, I refer to some problems of a TFE-made cartridge filter.

For the purpose of realizing accurate microfiltration, filter membranes must have excellent properties such as high temperature resistance, high chemical resistance, high tensile resistance, etc. To satisfy those requirements, all components of the cartridge filter such as membrane, support material, core, end cap, protective cage, etc. must also have such high performance. It is no exaggeration to say that materials capable of reflecting such a high performance will be limited to TFE and other few fluorinated polymers.

The following membranes are known: elongated membranes as disclosed in Japanese Examined Patent Publication No. 42-13560, published August 1976, Japanese Unexamined Patent Publication No. 49-118761, published November 1974, Japanese Examined Patent Publication No. 51-18991, published June 1976, or membranes as disclosed in Japanese Patent Publication No. 60-97832, published May 1985 or microporous membranes made of alkoxyethylene fluoride polymer (PFA), ethylene-propylene-ether copolymer fluoride (EPA) and tetrafluoroethylene-6-fluoropolypropylene copolymer (FEP) as described in Japanese Patent Application No. 59-135696 (filed in June 1984 in the name of the present inventor).

The TFE-made elongated membrane which is being used practically is so thin and flexible that it is not applicable for a conventional cartridge structure. A conventional membrane is supported on its surface by a supporting membrane and folded in a pleat form. Both upper and lower ends of the TFE-made membrane are sealed by heating means and jointed to both end caps by melting means. Since the TFE membrane is an elongated membrane, it is rapidly shrinked at a preheating time, i.e. when it begins to be softened. As a result, it becomes impossible to seal the TFE membrane.

Even if the end caps are made of PFA or EPE, those fluorinated polymers has smaller intermolecular affinity, melting means between an end of the TFE membrane and such end cap requires a certain pressure, so that it is very difficult to apply a certain pressure for a melted surface, thereby a complete sealing therebetween is not attainable. For this reason, at the present stage the TFE membrane is, at both upper and lower surfaces, supported by a polypropylene (pp) supporter. Further, the end cap is also made of PP. Accordingly, end sealing operation is forced to be carried out at a considerably lower melting point of PP than that of TFE. In other words, such end sealing operation is dependent on the physical properties of PP, so that the superior properties of TFE disappear. It is to be noted that the melting point of TFE is 327° C. at temperature, while that of PP is more or less 167° C.

In order to remove the aforementioned disadvantages of the prior art, this invention has been achieved.

BRIEF SUMMARY OF THE INVENTION

It is a general object of this invention to provide a pleat-type cartridge filter which is applicable for microfiltration in various industrial fields and has excellent filtering performance.

More particularly, the pleat-type cartridge filter comprises a pleat-type porous membrane having a longer length than an effective filtering surface thereof; upper and lower end plates; a plurality of segmented cylindrical core members disposed between the upper and lower end plates; and protective caps for fastening and sealing an upper and lower reminder of the pleat-type porous membrane other than the effective filtering surface thereof. Each of said end plates is provided with a plurality of fins, each of which is covered by the pleat-type porous membrane. The pleat-type porous membrane is folded at each corner of respective end plates and fastened firmly between the end plate and the protective cap by melting means, adhesion or sealing means.

Other and further objects, features and advantages of this invention will appear more fully from the following description taken in connection with the accompanying drawings.

BRIEF DESCRIPTION OF THE ACCOMPANYING DRAWINGS

DETAILED DESCRIPTION OF THE INVENTION

Preferred examples of this invention will now be described with reference to the accompanying drawings.

Figure 1:
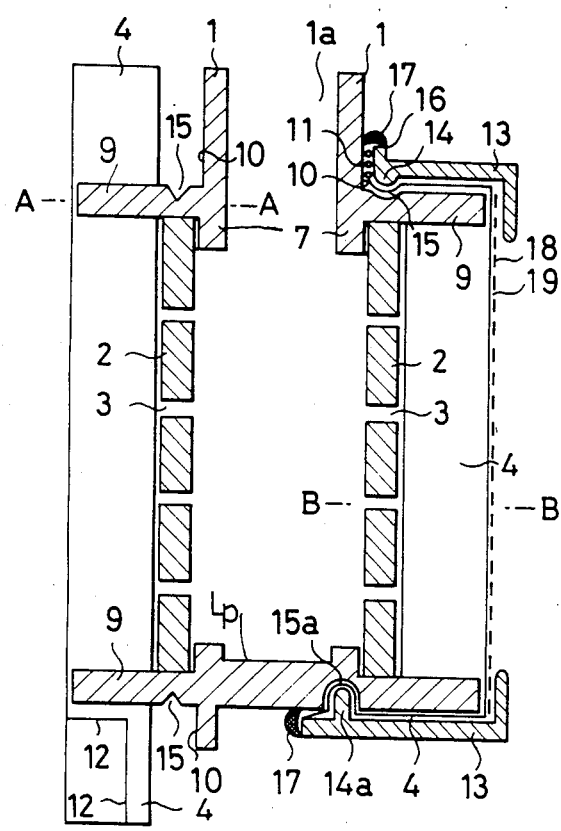
FIG. 1 is a vertical section view of a first example of a pleat-type cartridge filter according to this invention, in which a leftside membrane is not sealed yet, while a rightside membrane is already sealed.

In FIG. 1, there is shown a first example of a cartridge filter using a pleat-type porous membrane, in which a leftside membrane 4 is not sealed yet at both upper and lower ends thereof, while a rightside membrane 4 is already sealed thereat.

In the first example, all components including the porous membrane 4 are made of polytetrafluoroethylene (TFE). Please refer to the detailed specifications of Examples I and II of this invention which are listed in the last part of this Section.

Figure 2:
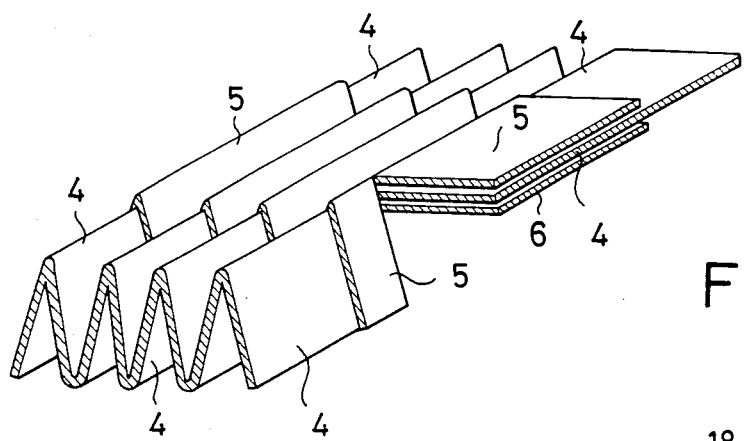
FIG. 2 is a partially cutaway perspective view of a pleat-type membrane which is, at its center, supported by two upper and lower supporters.

Numeral 1 is a cylindrical body of the cartridge filter and numeral 1a is an opening, through which a fluid passes. The bottom of the cartridge filter is closed as shown in FIG. 1. Numeral 2 is a core cylinder, in which a plurality of gaps 3 for enabling fluid flow are formed. As shown in FIG. 2, the TFE membrane 4 is, at its center, supported by an outer supporter 5 and an inner supporter 6 which is made of a TFE cloth. Namely, the TFE membrane 4 is extended in a leftside and rightside direction.

Figure 3:
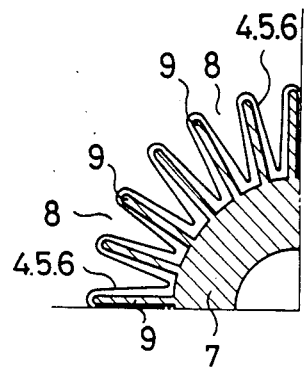
FIG. 3 is a section view of radially disposed fins taken on line A—A of FIG. 1.

Numeral 7 is a larger portion of the upper end plate 1. Numeral 9 is a fin. As shown in FIG. 3, a plurality of fins 9 are extended radially from the larger portion 7 of the upper end plate 1. Thus, a plurality of radial spaces 8 are formed between adjacent fins 9. The plurality of fins 9 are effective to define a pleat space of the TFE membrane 4 in regular order, thereby the TFE membrane can be suitably fitted upon the core cylinder 2. As shown in FIG. 1, the upper end plate 1, the larger portion thereof and the plurality of fins are formed integrally.

The number of fins 9 is identical with that of pleats of the TFE membrane 4. For example, the cartridge filter having 70 mm in diameter has 50 to 90 pleats, while that having 500 mm in diameter has 1,000 to 2,000 pleats or more. The number of fins 9 is equivalent to that of those pleats.

Means for fastening the TFE membrane 4 will be described.

First of all, the TFE membrane 4 is folded on the surface of the fins 9 and firmly fastened by a TFE string or the like along a side of the upper end plate 1. Numeral 11 is a thus folded and fastened portion. Then, it is partially cut off by a heated knife and subsequently sealed by soldering means. Such folded and sealed portion is something like a marshmallow and easily applicable for cutting and sealing.

When the cartridge has a large diameter and the membrane is thick or made of a hard material, a certain gap may occur at the sealed portion and a by-pass flow of fluid may take place. To prevent such inconvenience, a different kind of nonporous film may be connected to the porous membrane by melting means or the like.

In this case, as shown at numeral 12 of FIG. 1, a reminder of the membrane 4 may be cut off and sealed at a corner 10 of a lower end plate. Thus, the volume of the sealed portion at the corner 10 becomes smaller, so that it is advantageous for sealing an end of a large membrane.

Further, it is possible to enlarge an effective filtering surface of the membrane 4 without enlarging the outer diameter of the cartridge or reducing the number of pleats. It is realized by enlarging the height of each pleat by 1.2 to 2 times or more longer that that of a normal pleat. Thus, such a pleat-type membrane having a larger effective filtering surface may be set spirally on the core 2.

After the TFE membrane 4 has completely been sealed on the surface of the fins 9, a protective cap 13 is covered on the TFE membrane 4 as shown in the right side of FIG. 1. The protective cap 13 is provided with an annular projection 14 which is engaged with an annular recess 15 formed on the surface of the fins 9. Thus, the TFE membrane is firmly supported between the protective cap 13 and the fins 9.

A lug 16 of the protective cap 13 and the membrane fastened portion 11 are jointed with the outer side of the end plate 1 by a suitable heating treatment, melting means or injection molding means. Thus, a strongly sealed portion 17 is formed. The annular projection 14 and the annular recess 15 to be engaged therewith have the function to prevent heat transmission.

Figure 4:
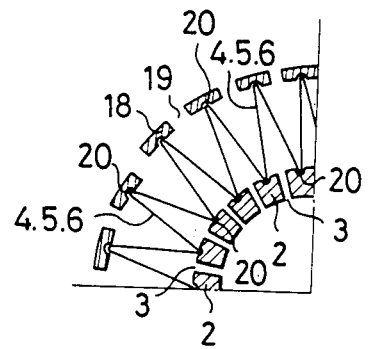
FIG. 4 is a section view of another example, in which no fin is disposed.

After that, a plurality of separable protective cages 18 are individually disposed in a vertical direction along respective summits of the pleat-type TFE membrane 4 as partially shown in another example of FIG. 4.

Connection of the protective cap 13 with the disc plate 1 may be made by TFE-made bolt and nut. (not illustrated).

The aforementioned fastening and sealing process is also carried out when fastening the leftside TFE membrane 4 of FIG. 1.

The TFE membrane 4 may be, at its bottom, fastened by another fastening means. The protection cap 13 has a larger annular projection 14a which can be engaged with a larger annular recess 15a formed in a disc type lower end plate Lp of the cartridge filter. The annular projection 14a and the annular recess 15a to be engaged therewith may be replaced with a lacerated projection and a V-shaped recess. Thus, the TFE membrane may be supported firmly between the former and the latter. The protective cap 13 and an end of the TFE membrane 4 are jointed to the lower plate Lp by any of the aforesaid suitable fastening means. Arrangement of such larger projection 14a and larger recess 15a is very effective for supporting a cartridge filter having a larger diameter, a box-type pleat unit. The sealed portion 17 may also be sealed by a suitable adhesive, sealant or the like.

FIG. 4 shows another example for fastening and supporting the pleat-type TFE membrane 4, in which no fin is used.

Since the same construction as shown in FIG. 1 has the same numerals, its description will be omitted.

Numeral 19 is a passage, through which fluid passes.

An outer surface of each core 2 as well as an inner surface of each protective cage 18 is provided with a triangular groove 20, in which each corner of the pleat-type TFE membrane 4 can be fitted. The triangular groove is formed vertically along an effective filtering surface of the core 2. In this example the TFE membrane is also supported at it center portion by both the outer and inner supporters 5, 6. Thus, the pleat-type TFE membrane 4 is supported and fixed in regular order between the plurality of protective cages 18 and the plurality of cores 2. The separable protective cage 18 is preferably convenient in assembling the cartridge filter of this invention. Two ends of the TFE membrane 4 are sealed by any of the suitable fastening and sealing means as described in FIG. 1.

Since the supporters of the pleat type TFE membrane 4 have the function to guarantee not to prevent the corners of the TFE membrane 4 from being collapsed, they have to be made of a mesh non-woven cloth or the like.

The example in FIG. 4 has an advantage to reduce the manufacturing cost of the cartridge filter.

Accordingly, this invention enables manufacturing of a highly sophisticated cartridge filter whose all parts are all made of TFE. Conventionally, it has been considered that it is impossible to manufacture such all TFE-made cartridge filter.

The TFE membrane is so flexible that it is susceptible of elongation as a result of a slight tension during operation. Consequently, pore diameters of the TFE membrane are enlarged particularly at the corners of the TFE membrane. To prevent such elongation due to external force, all corners of the pleat-type TFE membrane may be softened and shrinked by a heating bar. It is preferably carried out during soldering the TFE membrane, thereby its durable pleats are made.

Further, when connecting the upper and lower ends of the TFE membrane with a different kind of film, the latter may be a biaxially oriented film, thereby connection forms a tightly sealed portion by means of heating shrinkage.

As described above, all components including the porous membrane 4 are made of TFE, but this invention is applicable for not only TFE components, but also other different kinds of filtering materials.

Conventionally, the other diameter of the cartridge filter is about 70 mm (3 inch) and the length of it is from 250 mm (10 inch) to 1.016 mm (40 inch). Therefore, when operating filtration of a large quantity of fluid, a large number of cartridge filters of such a type e.g. 100 units must be combined with each other. It is an expensive and inefficient work. In addition, there are many connections, thereby there arises many cases of bad sealing and connections.

According to this invention, it is possible to produce a large-size cartridge filter having outer diameter 400 mm, core diameter 200 mm, overall length 1,000 and effective filtering surface 120 m$^2$ to 200 m$^2$ On the other hand, conventionally a large number of cartridge filters has been combined with each other. For example, a filter device manufactured by Brunswick Corp. (365 MSOH4-8FD-C150 Type) uses 89 units of cartridge filters each having outer diameter 3 inch and length 40 inch, thereby 178 m$^2$ of effective filtering surface is obtained.

Further, there is a HEPA-made filter unit for air cleaning, which has vertical length 610 mm, horizontal length 610, depth 290 and effective filtering are 24 m$^2$. It is produced by Nippon Muki Co., Ltd.

Accordingly, the cartridge filter of this invention has superior performance.

Further, a conventional small-size filter has outer diameter 3 inch, length 10 inch and effective filtering surface 0.4 m$^2$ to 0.7 m$^2$, while that of this invention is able to have outer diameter 4 inch, length 10 inch and effective filtering surface 1.5 m$^2$ to 2.70 m$^2$. Namely, when the outer diameter is increased only by 1 inch, the capacity of the effective filtering surface is increased by about four times.

The following table shows specification of two preferred Examples I, II of this invention.

| Parts of Cartridge Filter | Example I | Example II |
|---|---|---|
| Material of cartridge | TFE | PP |
|   Outer diameter | 76 m/m$\phi$ | 200 m/m$\phi$ |
|   Core diameter | 40 m/m$\phi$ | 150 m/m$\phi$ |
|   Overall length | 254 m/m$\phi$ | 254 m/m$\phi$ |
| Material of membrane | TFE | PE |
|   Pore diameter | 0.1 $\mu\phi$ | 0.15 |

| Parts of Cartridge Filter | Example I | Example II |
|---|---|---|
| Thickness | 0.1 m/m | 0.2 |
| Supporter (mesh) | TFE | PP |
| Protective cap | TFE | PP |
| Protective cage | TFE | PP |
| Number of pleats | 60 | 450 |
| Initial flow rate of liquid (C$_2$H$_5$OH) | 6.6 l/min | — |
| Initial flow rate of air | — | 234/min |
| Bubble point | 1.32 kg/cm$^2$ (Isopropanol) | 2.5 kg/cm$^2$ (CH$_3$OH) |
| Structure of sealing means at the upper section | The end plate has 30 fins extended radially. An end of the membrane is folded and fastened by TFE string on a side of the end plate. Then, the folded and fastened portion is cut off by a heated knife, and sealed by melting means. Next to this, the protective cap is covered and fixed with the end plate. (See a rightside upper portion of FIG. 1.) | No fin is disposed. A space between adjacent protective cages is 20 mm. 150 triangular grooves are formed in the protective cages as well as in the cores. Then, a pleat-type membrane is fixed. An end of the membrane is cut off in a L-shaped form. A reminder of the membrane is connected to a PP film having width 70 mm and thickness 0.05 mm, and the former is firmly fixed with the latter by melting means. After that, the protective cap is covered in the same way. |
| Structure of sealing means at the lower section | The end plate has 30 fins extended radially. An end of the membrane is folded and fastened by TFE string on a side of the end plate. Then, the folded and fastened portion is cut off by a heated knife, and sealed by melting means. Next to this, the protective cap is covered and fixed with the end plate. (See a rightside upper portion of FIG. 1.) | The membrane is fixed between a recess of the protective cap and a projection of the end plate to be engaged therewith. See a rightside lower portion of FIG. 1. |

In the case that the present cartridge filter is used for ultrafiltration or a separate membrane, the sealing means including cutting of the upper and lower ends of the membrane 4 in L-shaped form 12 is very effective. In this case, fluid flows from a head portion of the cartridge body into the interior thereof and is discharged in a circumferential direction.

The plurality of fins 9 are disposed radially and in parallel with each other adjacent the end plate 1 so that the fluid can flow uniformly.

The segmented protective cage 18 may be replaced with a cylindrical housing having a thin width.

As many apparently widely different examples of this invention may be made without departing from the spirit and scope thereof, it is to be understood that the invention is not limited to the specific examples thereof except as defined in the appended claims.

What is claimed is:

1. A cartridge filter comprising:

a pleat-type porous membrane having a longer length than an effective filtering surface thereof;

a cylindrical body;

a lower plate;

a plurality of fins extending radially from a lower part of said upper cylindrical body and from said lower plate;

each of said plurality of fins being covered by said pleat-type porous membrane; and said pleat-type porous membrane extending through said plurality of fins being folded and disposed along an outer circumference of said upper cylindrical body and fasteningly sealed at one end, wherein a thin and flexible film is connected to said folded or sealed end portion of said porous membrane.

2. A cartridge filter as claimed in claim 1, in which an end of said porous membrane is cut-off in a L-shaped form.

3. A cartridge filter as claimed in claim 1, in which said porous membrane is placed upon said lower plate and covered by a protective cap.

4. A cartridge filter as claimed in claim 3, in which said protective cap allows discharge of a fluid in a circumferential direction.

* * * * *